(12) United States Patent
Lunt et al.

(10) Patent No.: US 7,144,032 B2
(45) Date of Patent: Dec. 5, 2006

(54) EXPANDABLE PELVIC SIDE AIRBAG

(75) Inventors: Larry Lunt, Brigham City, UT (US); Mark L. Enders, Pleasant View, UT (US); Kurt Gammil, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 253 days.

(21) Appl. No.: 10/658,512

(22) Filed: Sep. 9, 2003

(65) Prior Publication Data

US 2005/0052005 A1    Mar. 10, 2005

(51) Int. Cl.
*B60R 21/21* (2006.01)

(52) U.S. Cl. .................................. 280/728; 280/730.2

(58) Field of Classification Search ............. 280/730.2, 280/730.1, 728.2, 728.3, 743.1
See application file for complete search history.

(56) References Cited

U.S. PATENT DOCUMENTS

| | | | | |
|---|---|---|---|---|
| 5,072,966 A | * | 12/1991 | Nishitake et al. | 280/730.2 |
| 5,382,051 A | | 1/1995 | Glance | |
| 5,544,913 A | * | 8/1996 | Yamanishi et al. | 280/730.2 |
| 5,615,914 A | | 4/1997 | Galbraith et al. | |
| 5,636,862 A | * | 6/1997 | Cheung et al. | 280/730.2 |
| 5,752,717 A | | 5/1998 | Galbraith et al. | |
| 5,839,756 A | | 11/1998 | Schenck et al. | |
| 5,868,422 A | | 2/1999 | Galbraith et al. | |
| 6,086,091 A | * | 7/2000 | Heinz et al. | 280/730.2 |
| 6,170,871 B1 | | 1/2001 | Goestenkors et al. | |
| 6,203,057 B1 | * | 3/2001 | Spencer et al. | 280/730.1 |
| 6,213,506 B1 | | 4/2001 | Swann et al. | |
| 6,286,858 B1 | * | 9/2001 | Shepherd et al. | 280/728.2 |
| 6,302,436 B1 | * | 10/2001 | Eyrainer | 280/730.2 |
| 6,302,437 B1 | * | 10/2001 | Marriott et al. | 280/732 |
| 6,345,838 B1 | | 2/2002 | Schneider | |
| 6,371,514 B1 | * | 4/2002 | Bombard | 280/730.2 |
| 6,378,896 B1 | * | 4/2002 | Sakakida et al. | 280/730.2 |
| 6,460,873 B1 | * | 10/2002 | Lebaudy et al. | 280/730.2 |
| 6,505,852 B1 | | 1/2003 | Lebaudy et al. | |

FOREIGN PATENT DOCUMENTS

| | | |
|---|---|---|
| EP | 885785 A1 * | 12/1998 |
| JP | 06270817 A * | 9/1994 |

OTHER PUBLICATIONS

Anonymous, "Side Impact Protection Device," Research Disclosure, Kenneth Mason Publications, Hampshire, GB vol. 375, No. 13, Jul. 1995, pp. 1-2.

* cited by examiner

*Primary Examiner*—David R. Dunn
(74) *Attorney, Agent, or Firm*—Sally J Brown (57) ABSTRACT

The present invention relates to a pelvic airbag. The pelvic airbag has a front panel and a rear panel that is attached to the front panel. The airbag is made of metal, plastic, or combinations of metal and plastic and is configured such that it may be retained in a vehicle door between the inner skin and the trim panel. The airbag is further constructed such that when it is in the uninflated configuration, the thickness of the airbag is between about 2 to about 25 millimeters. An attachment mechanism may also be attached to the airbag. The attachment mechanism is designed to attach the airbag to the vehicle door. Additionally, an inflator housing may be attached to the rear panel. The inflator housing houses an inflator that is designed to inflate the airbag in the event of an accident or crash.

60 Claims, 6 Drawing Sheets

EXPANDABLE PELVIC SIDE AIRBAG

BACKGROUND OF THE INVENTION

1. Field of the Invention

The present invention relates to systems for protecting vehicle occupants from injury. More specifically, the present invention relates to an expandable pelvic side airbag assembly that is designed to protect a vehicle occupant during an accident or crash.

2. Description of Related Art

Inflatable airbags enjoy widespread acceptance as passive passenger restraints for use in motor vehicles. This acceptance has come as airbags have built a reputation of preventing death and injury over years of use. Studies show that in some instances, the use of frontally-placed vehicular airbags can reduce the number of fatalities in head-on collisions by 25% among drivers using seat belts and by more than 30% among unbelted drivers. Other statistics suggest that in a frontal collision, the combination of a seat belt and an airbag can reduce the incidence of serious chest injuries by 65% and the incidence of serious head injuries by up to 75%. These numbers and the thousands of prevented injuries they represent demonstrate the life-saving potential of airbags and the need to encourage their use, production, and development.

Airbags are generally linked to a control system within the vehicle that triggers their initiation when a collision occurs. Generally, an accelerometer within the vehicle measures the abnormal deceleration caused by the collision event and triggers the ignition of an airbag inflator. This control system is often referred to as an electronic control unit (or "ECU"). The ECU includes a sensor that continuously monitors the acceleration and deceleration of the vehicle and sends this information to a processor that uses an algorithm to determine whether a deceleration experienced by the vehicle is caused by a collision or accident. Additional sensors may be linked to the ECU to allow the proper detection of side-impact collisions, rollovers, etc.

When the processor of the ECU determines, based on a set of pre-determined criteria, that the vehicle is experiencing a collision, the ECU transmits an electrical current to an initiator assembly connected to an inflator that is coupled to the airbag module. The initiator activates the inflator. An inflator is a gas generator that typically uses a compressed or liquefied gas or mixture of gases, a solid fuel, or some combination of the above to rapidly generate a volume of inflation gas. The gas inflates the airbag, which deploys into the path of the vehicle occupant and absorbs the impact of the vehicle occupant.

Recently, airbag technology has continued to advance such that airbags are now used to provide side impact and/or roll-over protection to the vehicle occupants. Curtain airbags attempt to combat the dangers of side impact or roll-over accidents by having a curtain airbag unroll or unfold downward from the roof of the vehicle and then inflate beside the person as a means of preventing the person from hitting the door, the window, or the side of the vehicle during lateral impact.

Furthermore, pelvic airbags have been developed to provide additional impact protection during side impact or roll-over conditions. These pelvic airbags are usually made of a woven nylon material and are attached to the vehicle's seat frame under the seat foam and fabric. More specifically, the pelvic airbags are positioned on the seat frame such that in the event of an accident or crash, the pelvic airbag will inflate and prevent the occupants' pelvis from harmfully impacting a portion of the vehicle.

Many pelvic airbag systems are currently designed such that the pelvic airbag is integral with a seat-mounted thorax cushion that is constructed to inflate and protect the occupants ribcage and/or sternum during a crash. However, because the pelvic airbag requires a higher pressure and a shorter inflation time than does the thorax airbag, it is often difficult to implement and install such integrally designed airbag systems on a wide variety of vehicle types and models. As a result, the practical applications of such integrally designed pelvic airbag systems have been severely limited.

Accordingly, there is a need in the art for a novel pelvic airbag system that addresses and/or solves one or more of the above-listed problems. Such a device is disclosed herein.

SUMMARY OF THE INVENTION

The apparatus of the present invention has been developed in response to the present state of the art, and in particular, in response to the problems and needs in the art that have not yet been fully solved by currently available pelvic airbags. Thus, the present invention to provides a pelvic airbag assembly that may be attached to or within a vehicle door having an outer skin, an inner skin, and a trim panel.

The pelvic airbag assembly comprises a pelvic airbag and an attachment mechanism that is connected to the pelvic airbag. The attachment mechanism is designed to retain the airbag on or within the vehicle door. More specifically, the attachment mechanism retains the pelvic airbag on or within the vehicle door such that the pelvic airbag is affixed or held between the trim panel and the inner skin.

In some embodiments, the attachment mechanism may comprise one or more mounting brackets that are attached to the back of the airbag. Such mounting brackets are preferably designed such that one or more fasteners may engage the brackets and affix the airbag to the inner skin. However, other types of attachment mechanisms may also be used including one or more weldments, welds, joints, bolts, screws, and/or other types of connectors.

The pelvic airbag that is used as part of the pelvic airbag assembly may be made of a material that is selected from the group consisting of metal, plastic, or combinations of metal and plastic. The type of metal that is used in making the airbag includes sheet metal, steel, copper, copper alloys, aluminum, aluminum alloys, iron alloys, and the like. For those embodiments that employ plastic, thermoplastics, polyester elastomers, and/or other types of plastic materials may be used.

The pelvic airbag has an uninflated configuration and an inflated configuration. When the airbag is in the uninflated configuration, the thickness of the airbag is between about 2 to about 25 millimeters. Embodiments in which the airbag is constructed entirely of metal may also be made in which the thickness of the airbag in the uninflated configuration is between about 2 to about 4 millimeters. Further embodiments that have the airbag constructed of a combination of metal and plastic may additionally be constructed in which the thickness of the airbag in the uninflated configuration is between about 7.5 to about 25 millimeters.

The pelvic airbag may be further constructed such that it comprises a front panel and a rear panel. The rear panel is situated behind the front panel and is attached to the front panel via welding, mechanical fasteners, and/or other methods. One or more folds may also be added to the airbag to increase expansion. Of course, other embodiments may also be made in which the rear panel will not contain a fold.

In addition to the pelvic airbag and the attachment mechanism, the pelvic airbag assembly may further comprise an inflator that is in fluid communication with the pelvic airbag. The inflator is housed within an inflator housing and is preferably positioned such that the inflator and the housing are situated behind the airbag.

A reaction beam may further be added to the pelvic airbag assembly. The reaction beam is a post or surface that is attached to the inner skin and is positioned behind the pelvic airbag. In some embodiments, the reaction beam is constructed such that in the event of an accident, the reaction beam will support the pelvic airbag. Yet further embodiments may be constructed in which the reaction beam bows or curves inwardly towards the rear panel.

The pelvic airbag assembly may further include a dampener. The dampener is a layer of rubber, plastic, or the like that is positioned between the inflator housing and the reaction beam. Preferably, the dampener is constructed to dampen and/or eliminate any noise, rattling, and/or vibrations caused by the reaction beam contacting or pressing against the inflator housing.

In the event of a crash or accident, the pelvic airbag assembly is constructed such that the airbag will convert from the uninflated configuration into the inflated configuration. When the airbag is in the inflated configuration, the airbag provides impact protection to the pelvis and/or leg region of a vehicle occupant. In some embodiments, this may be accomplished by configuring the airbag assembly such that when the airbag converts into the inflated configuration, the airbag passes through an aperture positioned on the trim panel. In other embodiments, the trim panel and/or a door cover covers the airbag such that when the airbag converts into the inflated configuration, the airbag tears the door core and/or dislodges, distorts, and/or tears through the trim panel.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 6, is not intended to limit the scope of the invention, as claimed, but is merely representative of presently preferred embodiments of the invention.

Figure 1:
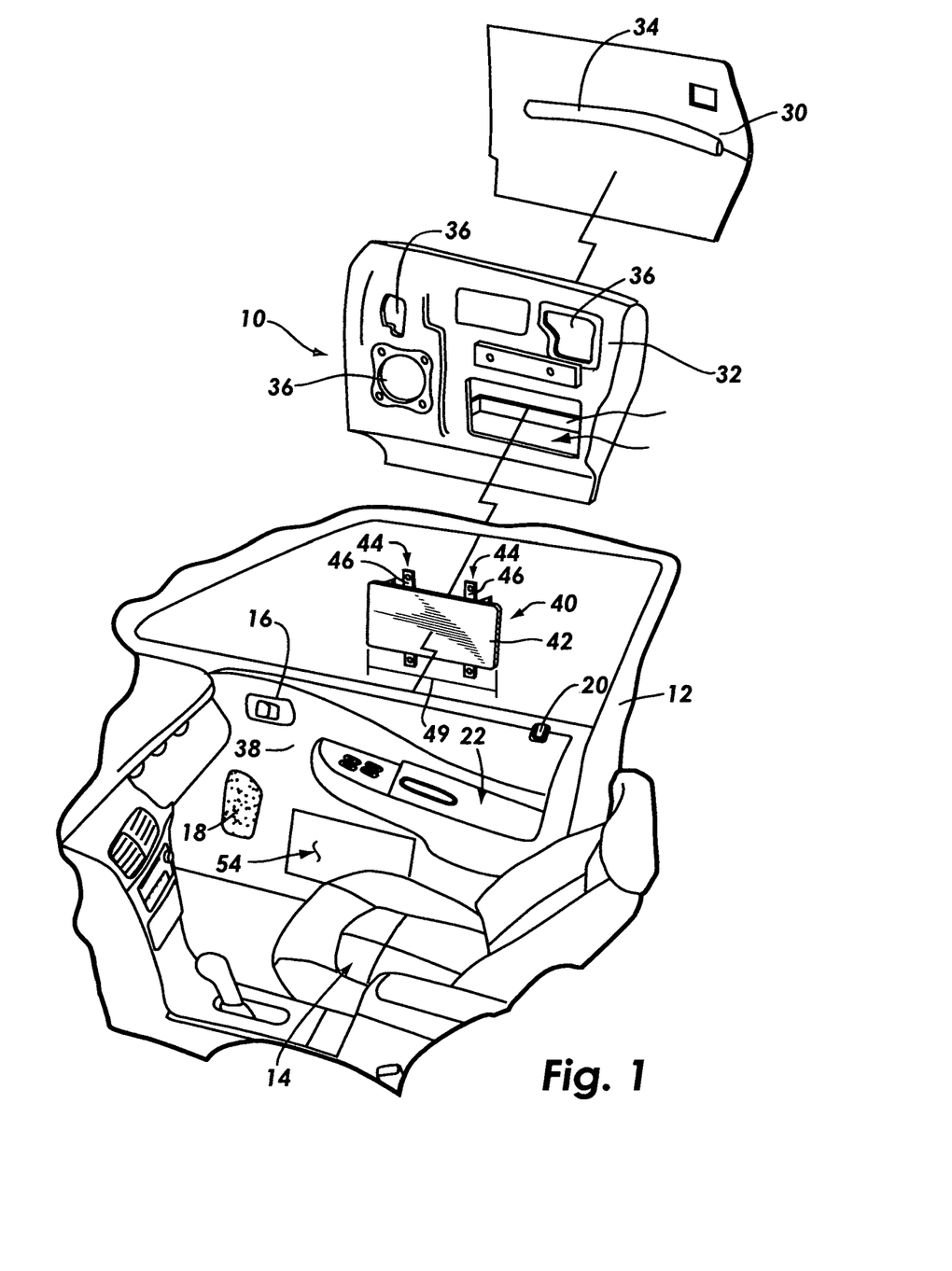
FIG. 1 is an exploded view of a vehicle door including a pelvic airbag assembly according to the present invention.

Referring to FIG. 1, an exploded view of a vehicle door 10 is depicted. As illustrated in FIG. 1, the vehicle door 10 is a front passenger-side door that is positioned forward of the vehicle's B pillar 12. Alternatively, the vehicle door 10 may also represent all types of vehicle doors generally, including both front drivers-side doors and passenger compartment doors. The vehicle door 10 is positioned proximate to an occupant seat 14 and includes a door latch 16, an audio speaker 18, a lock switch 20, and an armrest 22. Of course, other types of components and/or elements may also be added to the vehicle door 10.

The vehicle door 10 comprises an outer skin 30 and an inner skin 32. The inner skin 32 is positioned inside of the outer skin 30. Preferably, the outer skin 30 and the inner skin 32 are constructed of steel or other types of metal and are attached to the vehicle body (not shown). A stiffening bar 34 designed to render support and/or structural integrity to the vehicle door 10 during a crash or accident may also be added to the door 10 between the outer skin 30 and the inner skin 32.

The inner skin 32 may further include one or more openings 36. The openings 36 are positioned on the interior side of the inner skin 32 and are designed to facilitate the addition of the door latch 16, the audio speaker 18, and/or the lock switch 20 to the vehicle door 10. More specifically, the openings 36 are designed such that the door latch 16, the audio speaker 18, and/or the lock switch 20 may fit into the openings 36.

The vehicle door 10 may further comprise a trim panel 38. The trim panel 38 is a layer of vinyl, plastic, leather, or other similar materials that is positioned on the interior of the vehicle door 10 in order to improve the visual appearance of the door 10. Preferably, the trim panel 38 is attached to the inner skin 32 such that the trim panel 38 covers the inner skin 32 and the outer skin 30.

A pelvic airbag assembly 40 may also be attached to the vehicle door 10. The pelvic airbag assembly 40 includes a pelvic airbag 42 that has a length 49. The airbag assembly 40 is constructed such that the pelvic airbag 42 may be retained in the vehicle door 10 between the trim panel 38 and the inner skin 32. Such retention of the pelvic airbag 42 is preferably accomplished by constructing the pelvic airbag assembly 40 with an attachment mechanism 44 that permanently affixes and holds the pelvic airbag 42 between the trim panel 38 and the inner skin 32.

In the embodiment shown in FIG. 1, the attachment mechanism 44 comprises one or more mounting brackets 46. The mounting brackets 46 are attached to the back of the pelvic airbag 42. Preferably, the mounting brackets 46 are metal tabs or bars that span the height of the airbag 42 and are constructed such that one or more fasteners (not shown)

may engage the mounting brackets 46 and attach the pelvic airbag 42 to the inner skin 32.

Those of skill in the art will recognize that other embodiments may be made in which the attachment mechanism 44 differs from that which is shown in FIG. 1. Specifically, embodiments may be constructed in which the attachment mechanism 44 comprises bolts, screws, studs, tabs, extensions, hooks, weldments, or any other types of fasteners or connectors that are capable of attaching the pelvic airbag 42 on or within the vehicle door 10. Yet further embodiments may have the attachment mechanism 44 comprise a weld or joint that connects the airbag 42 to the vehicle door 10.

In order to facilitate the retention of the pelvic airbag 42 between trim panel 38 and the inner skin 32, a recess 48 may be also added to the inner skin 32. The recess 48 is an opening or depression in the inner skin 32 that is designed to accommodate the pelvic airbag 42. Preferably, the size of the recess 48 corresponds to the size of the pelvic airbag 42, thereby ensuring that there is sufficient space between the trim panel 38 and the inner skin 32 to position and/or retain the pelvic airbag 42.

The pelvic airbag 42 that may be used as part of the pelvic airbag assembly 40 has an uninflated configuration and an inflated configuration. As seen in FIG. 1, the airbag 42 is in the uninflated configuration. The airbag 42 is preferably constructed such that when in the uninflated configuration, the airbag 42 is substantially rectangular or substantially trapezoidal in shape. However, other embodiments may also be made in which the pelvic airbag 42 has a square, round, triangular, pentagonal, hexagonal, polygonal, quadrilateral, or any other desired shape.

The material used to construct the pelvic airbag 42 is selected from the group consisting of metal, plastic, or combinations of metal and plastic. If metal is used to construct the airbag 42, sheet metal such as thin steel is preferred. However, other metals including copper, copper alloys, aluminum, aluminum alloys, iron alloys, other type of steel, and the like may also be used. For those embodiments that require the use of plastic, the plastic is preferably a thermoplastic or a polyester elastomer material. Again however, further embodiments may also be made using one or more other types of plastic materials.

The pelvic airbag 42 may also be constructed such that the thickness of the airbag 42 in the uninflated configuration is between about 2 to about 25 millimeters. Additional embodiments in which the airbag 42 is made entirely of metal may have the thickness of the airbag 42 in the uninflated configuration between about 2 to about 4 millimeters. Yet further embodiments in which the airbag 42 is made of a combination of metal and plastic may have the thickness of the airbag 42 in the uninflated configuration be between about 7.5 to about 25 millimeters.

Referring still to FIG. 1, a reaction beam 52 may further be added to the pelvic airbag assembly 40. The reaction beam 52 is a post or surface that is attached to the inner skin 32. Preferably, the reaction beam 52 is positioned behind the pelvic airbag 42 such that in the event of a crash or accident, the reaction beam 52 supports the pelvic airbag 42 and/or prevents the pelvic airbag 42 from collapsing into the recess 48.

The reaction beam 52 illustrated in FIG. 1 is a horizontal metal bar that is positioned within the recess 48. Other embodiments may be made using more than one reaction beam 52 and/or have the reaction beam 52 oriented vertically, diagonally, curved, or in any other desired direction or configuration. Further embodiments may be constructed in which the reaction beam 52 is not positioned within the recess 48. Still further embodiments may have the reaction beam 52 constructed of a material other than metal including plastic and the like.

The trim panel 38 may additionally be constructed to include an aperture 54. The aperture 54 is a hole or an opening that is configured such that the position of the aperture 54 corresponds to the position of the pelvic airbag 42 when the airbag 42 is attached to the inner skin 32. Preferably, the size of the aperture 54 is selected such that during a crash or accident, the pelvic airbag 42 may pass through the aperture 54 and deploy into the interior of the vehicle.

Figure 2:
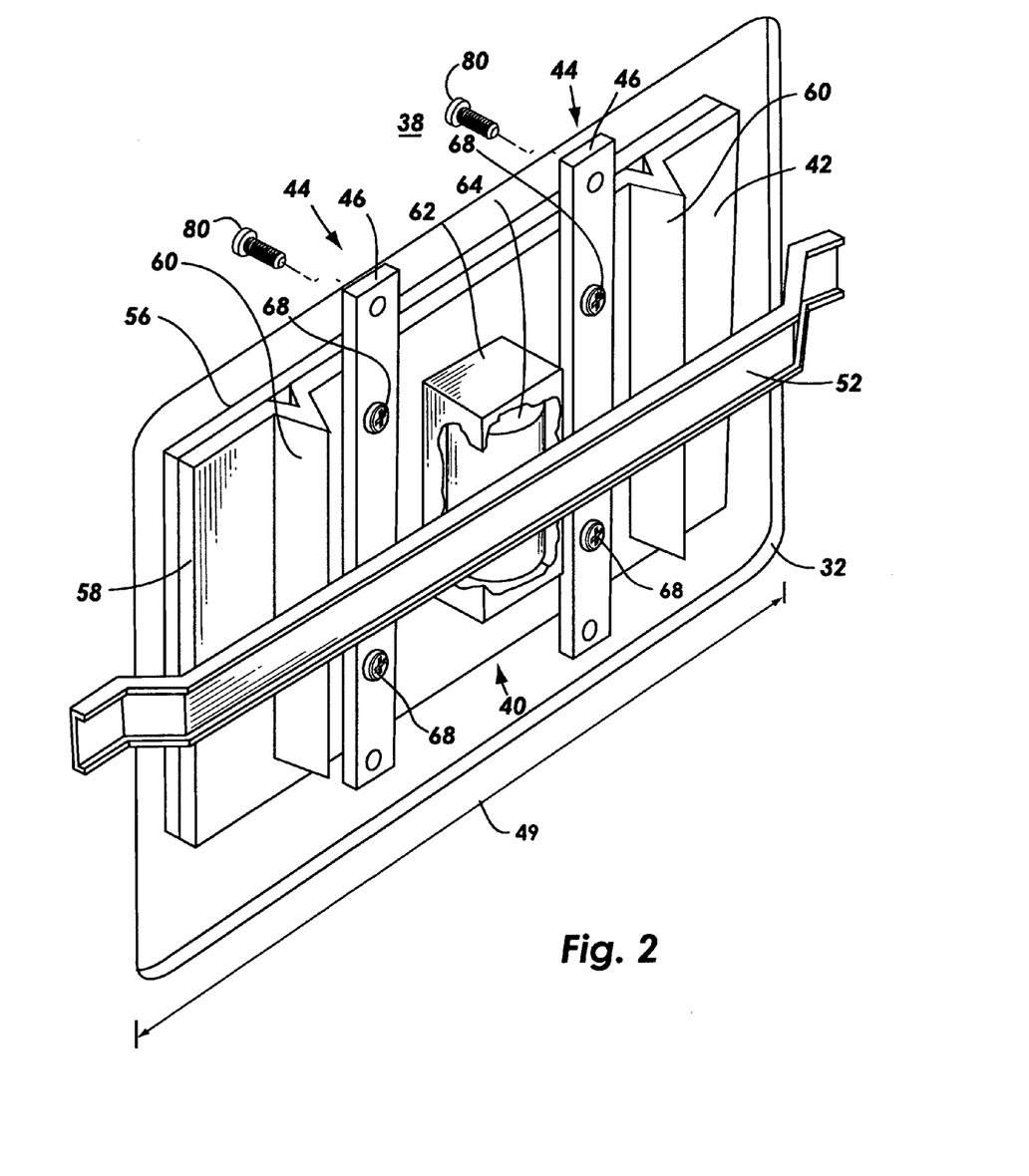
FIG. 2 is a partially cutaway rear perspective view of the pelvic airbag assembly.

Referring now to FIG. 2, a partially cutaway perspective view of the pelvic airbag assembly 40 including the pelvic airbag 42 is illustrated in greater detail. As can be seen in FIG. 2, the pelvic airbag 42 is constructed such that it comprises a front panel 56 and a rear panel 58 that is attached to the front panel 56. The rear panel 58 is situated behind the front panel 56. Preferably, the rear panel 58 is attached to the front panel 56 via methods such as spot welding, RF welding, sonic welding, and the like. However, other embodiments may also be made in which the rear panel 58 is attached to the front panel 56 via other methods such as through mechanical fasteners, connectors, and the like.

The pelvic airbag 42 may also include one or more folds 60 that are added to the rear panel 58. In some embodiments, the folds 60 may be constructed to allow the pelvic airbag 42 to be larger and/or made of more material without increasing the thickness of the pelvic airbag 42 in the uninflated configuration. Of course, other embodiments of the airbag assembly 40 may also be made in which there rear panel 58 is constructed without any folds.

The pelvic airbag assembly 40 may additionally comprise an inflator housing 62 that houses an inflator 64. The inflator 64 is of the type known in the art and is constructed to be in fluid communication with the pelvic airbag 42. Preferably, the inflator housing 62 and the inflator 64 are positioned behind the airbag 42 such that the housing 62 is between the pelvic airbag 42 and the reaction beam 52.

As illustrated in FIG. 2, the attachment mechanism 44 comprises two mounting brackets 46. The mounting brackets 46 may be metal bars or plates that are attached to the pelvic airbag 42 through the use of one or more connectors 68. Preferably, the connectors 68 are a bolt and nut assembly that engages the pelvic airbag 42 and the mounting bracket 46. Other types of connectors 68 such as screws, rivets, toxlocks, fasteners, and the like may also be used.

The pelvic airbag assembly 40 is attached to the vehicle door 10 via the fasteners 80. More specifically, the fasteners 80 engage and pass through the mounting brackets 46 such that the pelvic airbag assembly 40 becomes attached to the inner skin 32. As seen in FIG. 2, the fasteners comprise one or more bolts. However, rivets, screws, rivets, toxlocks, fasteners, and the like may also be used.

The pelvic airbag assembly 40 may further be constructed such that the reaction beam 52 bows inwardly towards from the inner skin 32. More specifically, the reaction beam 52 may be bowed inwardly such that when the pelvic airbag assembly 40 is installed, the reaction beam 52 may press against the inflator housing 62, the mounting brackets 46, the folds 60, the rear panel 58, and/or the pelvic airbag assembly 40.

Figure 3:
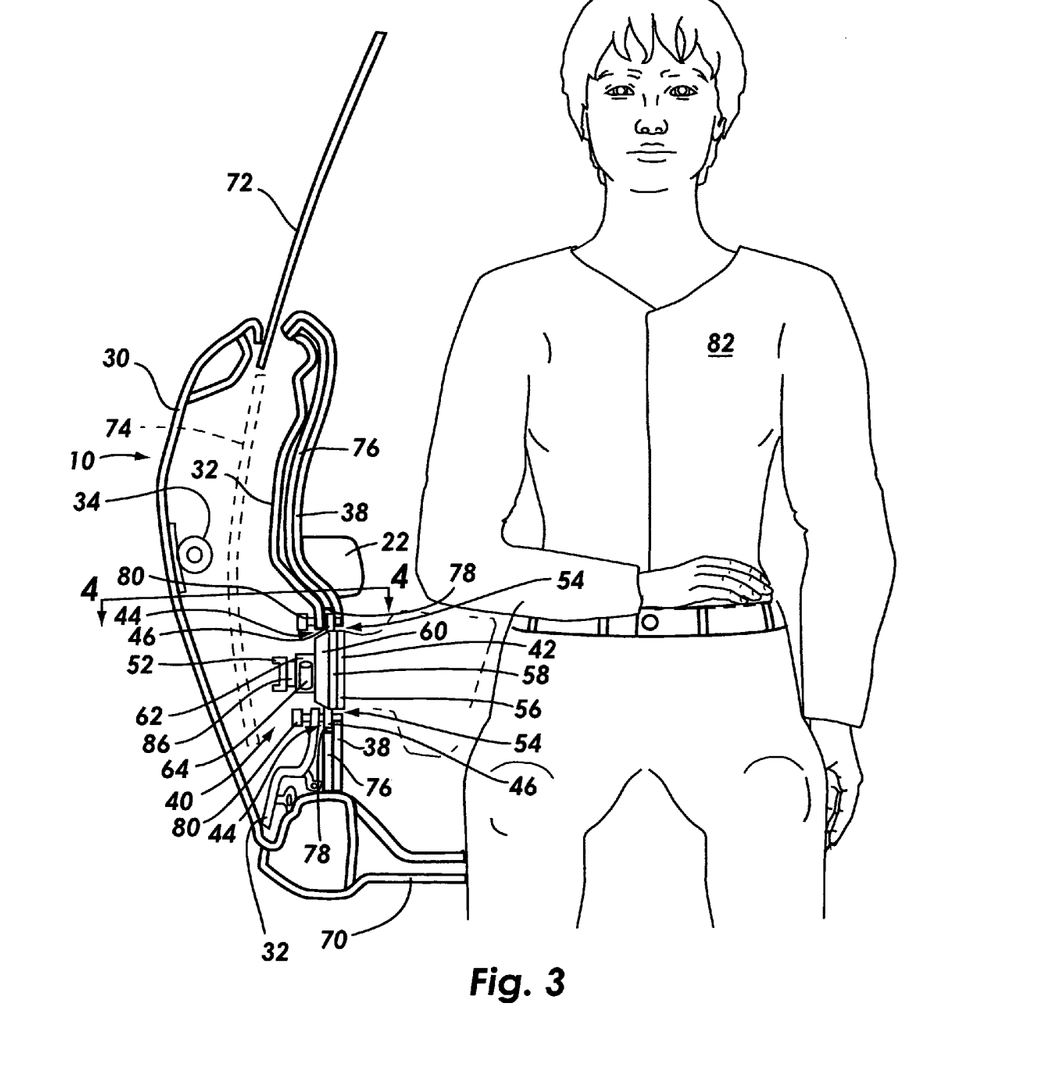
FIG. 3 is a cross-sectional view of the vehicle door and the pelvic airbag assembly.

FIG. 3 is a cross-sectional view of the vehicle door 10. As can be seen in FIG. 3, the vehicle door 10 is attached to a vehicle body 70. A windowpane 72 and a window path 74 are also illustrated as part of the vehicle door 10. The window path 74 is positioned between the inner skin 32 and the outer skin 30 and is preferably designed such that if the windowpane 72 is rolled down, the windowpane 72 is stored and received by the window path 74.

The vehicle door 10 may further comprise a door core 76. The door core 76 is a layer of material such as polyvinyl and the like that is positioned between the inner skin 32 and the trim panel 38. Preferably, the door core 76 also includes a hole 78 that is configured such that the position and size of the hole 76 corresponds to the position and the size of the aperture 54 in the trim panel 38.

As illustrated in FIG. 3, the pelvic airbag assembly 40 is attached to the vehicle door 10 via the fasteners 80. More specifically, the fasteners 80 engage and pass through the mounting brackets 46 such that the pelvic airbag assembly 40 becomes attached to the inner skin 32.

The pelvic airbag assembly 40 is further constructed such that in the event of an accident or crash, the airbag 42 will provide impact protection to a vehicle occupant 82. If a crash occurs, a sensor (not shown) and/or a control unit (not shown) will detect the crash and activate the inflator 64. Once activated, the inflator 64 produces and/or channels a large volume of inflation gas into the pelvic airbag 42. This influx of inflation gas converts the pelvic airbag 42 from the uninflated configuration to the inflated configuration (shown in phantom lines). As can be seen in FIG. 3, when the airbag 42 is in the inflated configuration, the airbag 42 passes through the aperture 54 and/or the hole 78 such that the airbag 42 contacts and/or becomes situated adjacent to the pelvis and/or leg of the vehicle occupant 82.

In the embodiment shown in FIG. 3, the airbag assembly 40 has been constructed such that when the airbag 42 is inflated, the airbag 42 protects a vehicle occupant 82 by increasing the rigidity of the vehicle door 10. Other embodiments may also be made in which the airbag assembly 40 is constructed such that when the when the airbag 42 is inflated, the airbag 42 protects a vehicle occupant 82 by dissipating and/or absorbing the energy associated with the crash.

A dampener 86 may also be added to the pelvic airbag assembly 40. The dampener 86 is a layer of rubber, plastic, or the like that is positioned between the inflator housing 62 and the reaction beam 52. Preferably, the dampener 86 is constructed such that it dampens and/or eliminates any noise, rattling, and/or vibrations caused by the reaction beam 52 contacting or pressing against the inflator housing 62.

Figure 4:
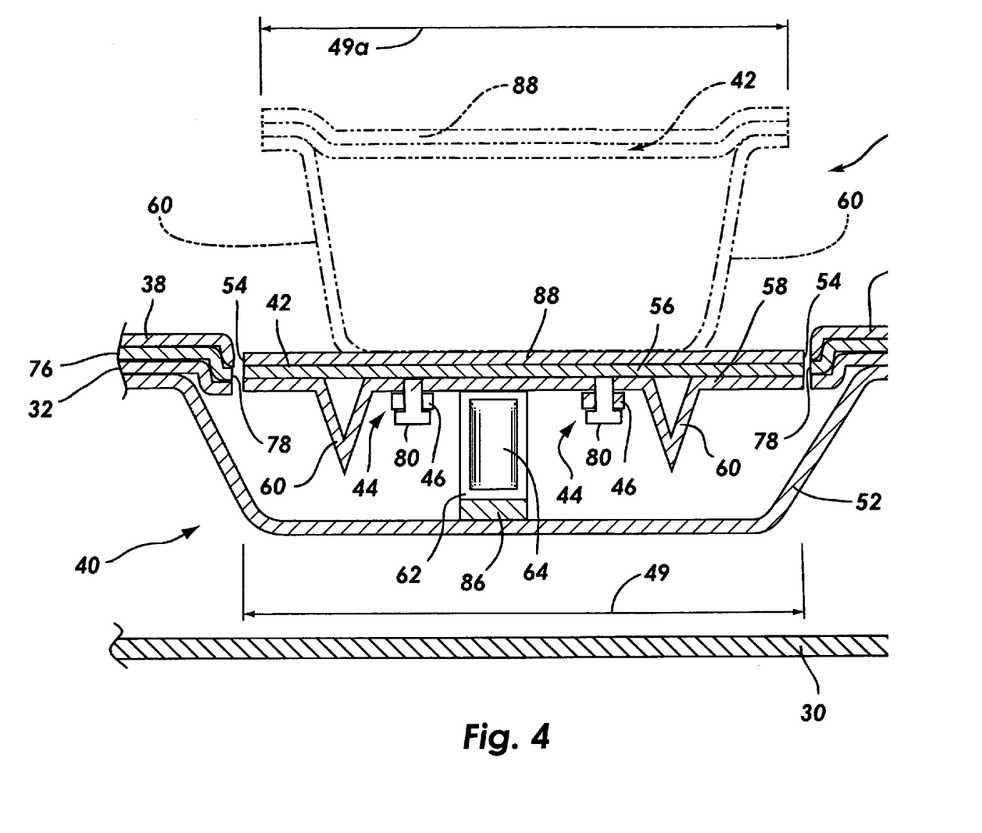
FIG. 4 is a cross-sectional view of the vehicle door and the pelvic airbag assembly taken along the line 4—4 of FIG. 3.

Referring now to FIG. 4, a cross-sectional view taken along the line 4—4 of FIG. 3 illustrates in greater detail the pelvic airbag assembly 40 attached to the vehicle door 10. As can be seen in FIG. 4, the pelvic airbag assembly 40 may further be constructed such that the pelvic airbag 42 includes a shell layer 88. Preferably, the shell layer 88 fits into the aperture 54 and is attached to the front panel 56 opposite the rear panel 58. The shell layer 88 is designed to cover and protect the pelvic airbag 42 as well as improve the visual aesthetics of the vehicle door 10 by preventing a vehicle occupant from viewing the front panel 56, the rear panel 58, and/or the pelvic airbag assembly 40.

The shell layer 88 may be made of a material such as vinyl, plastic, leather, and the like. The color, texture, and/or specific material used to make the shell layer 88 is preferably selected such that the shell layer 88 will match the trim panel 38 or the vehicle interior. In some embodiments, the shell layer 88 is made of the same material that is used to make the trim panel 38.

In the embodiment shown in FIG. 4, the inflated configuration of the airbag 42 is shown in phantom lines. As can be seen in FIG. 4, the airbag assembly 40 may further be constructed such that when the airbag 42 is deployed into the inflated configuration, the length 49a of the airbag 42 will decrease. Of course, other embodiments may also be made in which the airbag assembly 40 is constructed such that when the airbag 42 is deployed into the inflated configuration, the length 49a of the airbag 42 remains substantially unchanged. Yet further embodiments may also be constructed such that when the airbag 42 is deployed into the inflated configuration, the length 49a of the airbag 42 increases.

Figure 5:
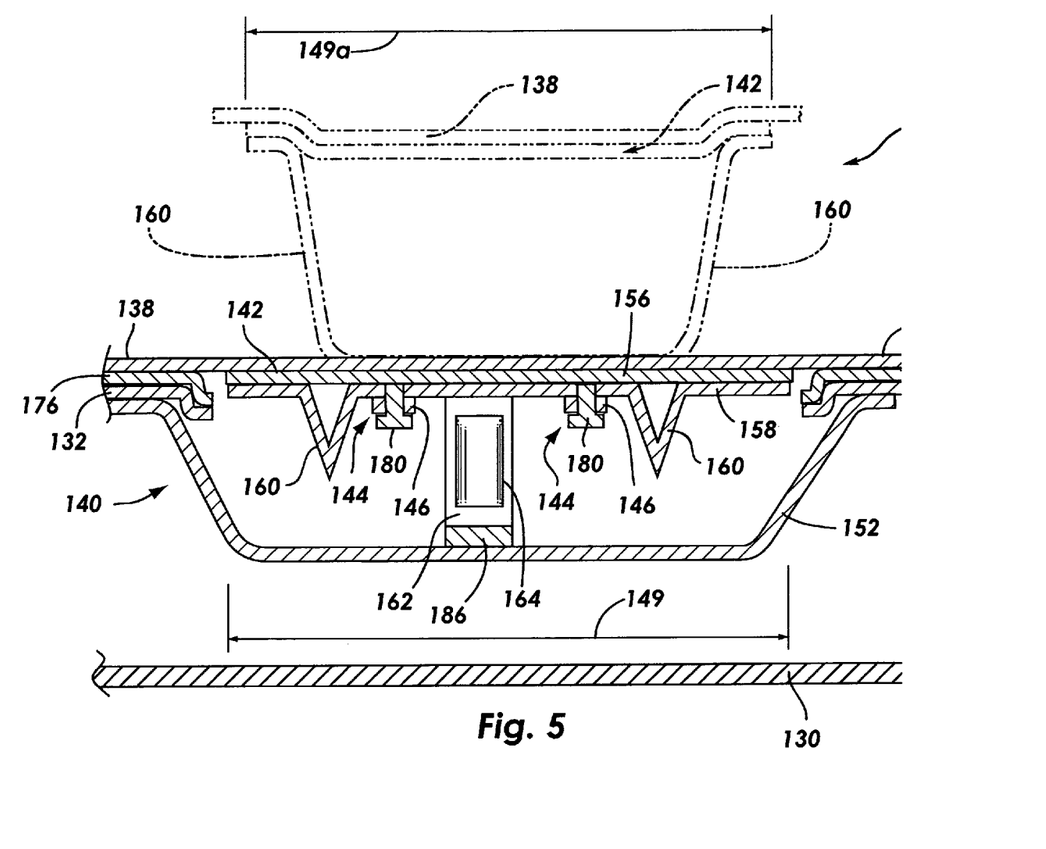
FIG. 5 is a cross-sectional view of a vehicle door including a further embodiment of the present invention.

Referring now to FIG. 5, a further embodiment of the present invention is illustrated. More specifically, FIG. 5 is a cross-sectional view of a pelvic airbag assembly 140 attached to a vehicle door 110 that is similar to the view shown in FIG. 4. As can be seen in FIG. 5, most of the components and elements of the vehicle door 110 and pelvic airbag assembly 140 are similar and/or equivalent to the components and elements that are found the embodiment described above.

The vehicle door 110 comprises an outer skin 130, and inner skin 132, and a trim panel 138. The inner skin 132 is positioned inward of the outer skin 130. A door core 176 may also be added and positioned between the inner skin 132 and the trim panel 138. Preferably, the trim panel 138 is positioned on the interior of the door 110 and is designed to improve the visual appearance of the vehicle door 110 by covering the inner skin 132, the door core 176, and/or the outer skin 130.

The pelvic airbag assembly 140 includes a pelvic airbag 142 and an attachment mechanism 144. The attachment mechanism 144 is attached to the pelvic airbag 142. As shown in FIG. 5, the attachment mechanism 144 comprises one or more mounting brackets 146 that are constructed such that one or more fasteners 180 may engage the brackets 146 and cause the vehicle door 110 to retain the pelvic airbag 142 between the inner skin 132 and the trim panel 138. As noted above however, other embodiments may be made in which the attachment mechanism comprises one or more weldments, welds, fasteners, bolts, connectors, and the like.

The construction and thickness of the pelvic airbag 142 is similar to the airbag that is described in the embodiment shown in FIGS. 1 through 4. The pelvic airbag 142 includes a front panel 156 and a rear panel 158 that is attached to the front panel 156. One or more folds 160 may also be added and positioned on the rear panel 158.

An inflator housing 162 that houses an inflator 164 may also be added to the pelvic airbag assembly 140. The inflator 164 is in fluid communication with the pelvic airbag 142 and is capable of causing the airbag 142 to convert from an uninflated configuration to an inflated configuration. Preferably, the inflator housing 162 is attached to the rear panel 158.

The pelvic airbag assembly 140 may further comprise a reaction beam 152. The reaction beam 152 is a post or surface that is attached to the inner skin 132 and is constructed to provide support the pelvic airbag 142 during a crash. A dampener 186 may also be added to prevent the reaction beam 152 from contacting the inflator housing 162 and causing an undesirable noise, rattle, and/or vibration.

As with the embodiment described above, the inflated configuration of the airbag 142 is shown in phantom lines. As can be seen in FIG. 5, the airbag assembly 140 may further be constructed such that when the airbag 142 is deployed into the inflated configuration, the lateral length 149a of the airbag 142 will decrease. Of course, other embodiments may also be made in which the airbag assembly 140 is constructed such that when the airbag 142 is deployed into the inflated configuration, the lateral length 149a of the airbag 142 remains substantially unchanged. Yet further embodiments may also be constructed such that when the airbag 142 is deployed into the inflated configuration, the lateral length 149a of the airbag 142 increases.

However, unlike the embodiment shown in FIG. 4, the trim panel 138 is an integral layer that is placed over the pelvic airbag 142. Accordingly, the pelvic airbag assembly 140 is constructed such that when the inflator 164 causes the pelvic airbag 142 to convert into the inflated configuration, the airbag 142 will distort, dislodge, and/or tear through all or a portion of the trim panel 138.

Figure 6:
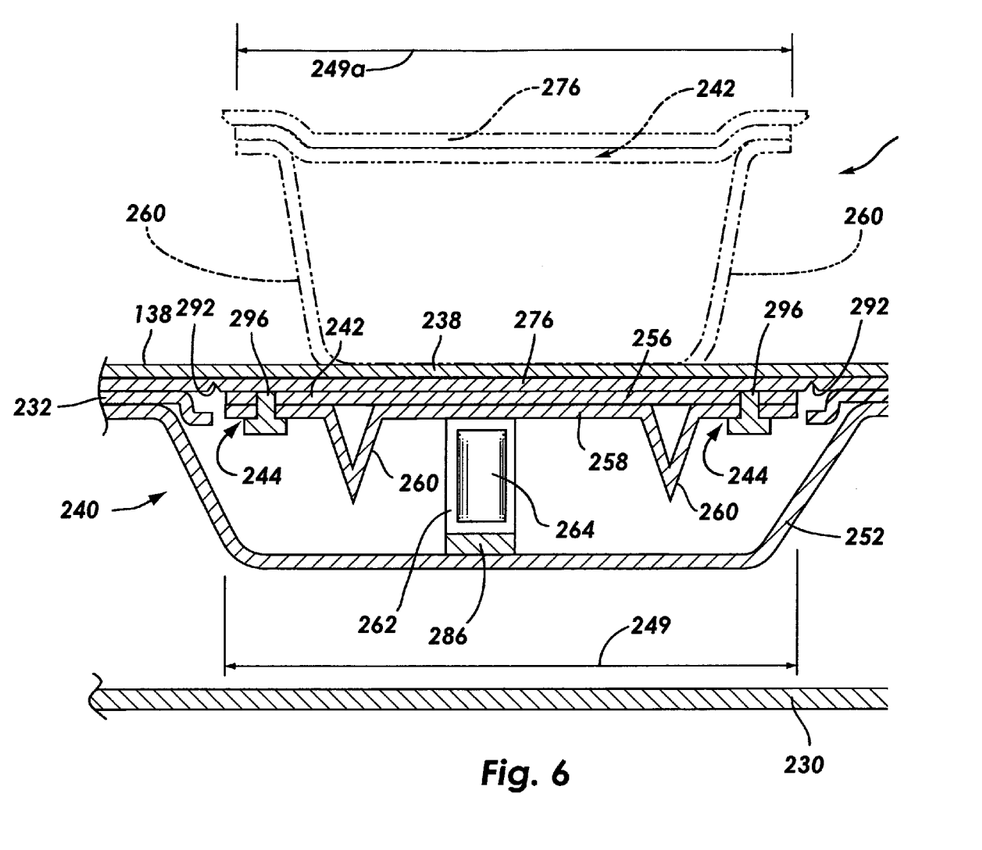
FIG. 6 is a cross-sectional view of a vehicle door including yet an additional embodiment of the present invention.

Referring now to FIG. 6, an additional embodiment of the present invention in illustrated. FIG. 6 is a cross-sectional view that is similar to the view shown in FIG. 5. More specifically, FIG. 6 is a cross-sectional view of a pelvic airbag assembly 240 that has been attached to a vehicle door 210. As can be seen by FIG. 6, most of the components and elements of the vehicle door 210 and pelvic airbag assembly 240 are similar and/or equivalent to the components and elements that are found the embodiments described above.

The vehicle door 210 comprises an outer skin 230, an inner skin 232, and a trim panel 238. The inner skin 232 is positioned inward of the outer skin 230. A door core 276 may also be added. Preferably, the trim panel 238 is positioned on the interior of the door 210 and is designed to improve the visual appearance of the vehicle door 210 by covering the inner skin 232, the door core 276, and/or the outer skin 230.

The pelvic airbag assembly 240 includes a pelvic airbag 242 and an attachment mechanism 244. The attachment mechanism 244 is attached to the pelvic airbag 242 and is designed to cause the vehicle door 210 to retain the pelvic airbag 242 between the inner skin 232 and the trim panel 238.

The thickness and construction of the pelvic airbag 242 that is used in the pelvic airbag assembly 240 is similar to that which is outlined in the embodiments described above. Specifically, the airbag 242 comprises a front panel 256 and a rear panel 258 that is attached to the front panel 256. One or more folds 260 may also be added and positioned on the rear panel 258.

An inflator housing 262 that houses an inflator 264 may also be added to the pelvic airbag assembly 240. The inflator 264 is in fluid communication with the pelvic airbag 242 and is constructed to cause the airbag 242 to convert from an uninflated configuration to an inflated configuration. Preferably, the inflator housing 262 is attached to the rear panel 258.

The pelvic airbag assembly 240 may further comprise a reaction beam 252. The reaction beam 252 is a post or surface that is attached to the inner skin 232 and is constructed to provide support the pelvic airbag 242 during a crash. A dampener 286 may also be added to prevent the reaction beam 252 from contacting the inflator housing 262 and causing an undesirable noise, rattle, and/or vibration.

As with the embodiment shown in FIG. 5, the trim panel 238 is an integral layer that covers the pelvic airbag 242. However unlike FIG. 5, the door core 276 is also positioned over the pelvic airbag 242. The door core 276 includes one or more tear seams 292 that are constructed such that when the inflator 264 deploys the pelvic airbag 242 into the inflated configuration, the airbag 242 tears the door core 276 at the tear seams 292. Once the door core 276 has been torn, the airbag 242 passes through the core 276 and finishes the inflation process by distorting, dislodging, and/or tearing through the trim panel 238.

Referring still to FIG. 6, the attachment mechanism 244 comprises one or more weldments 296 that are made of plastic and the like. The weldments 296 are tabs or extension that may be attached to both the door core 276 and the rear panel 258 via methods such as RF welding, sonic welding, spot welding, and the like. One or more connectors may also be used to connect the weldments 296 to the door core 276 and/or the rear panel 258. Preferably, the weldments 296 are constructed and attached to the door core 276 and the airbag 242 such that the airbag 242 is integral with the door core 276 and/or the trim panel 238.

As with the embodiments described above, the inflated configuration of the airbag 242 is shown in phantom lines. As can be seen in FIG. 6, the airbag assembly 240 may further be constructed such that when the airbag 242 is deployed into the inflated configuration, the lateral length 249 of the airbag 242 will decrease to a length of 149a. Of course, other embodiments may also be made in which the airbag assembly 240 is constructed such that when the airbag 242 is deployed into the inflated configuration, the length 249 of the airbag 242 remains substantially unchanged. Yet further embodiments may also be constructed such that when the airbag 242 is deployed into the inflated configuration, the length 249a 249 of the airbag 242 increases.

In summary, the present invention provides a novel pelvic airbag that may be retained in a vehicle door between the trim panel and the inner skin. As such, many of the limitations associated with known pelvic airbags that have the airbag attached to the vehicle door between the inner skin and the outer skin are effectively eliminated.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A pelvic airbag comprising:
   a front panel; and
   a rear panel attached to the front panel, the airbag being constructed to be retained in a recess of an inner skin of a vehicle door, the airbag being attached to the inner skin, wherein the airbag is attached to an attachment mechanism comprising one or more mounting brackets that span the rear panel, wherein one or more fasteners engage the one or more mounting brackets and attach the airbag to the inner skin, wherein the one or more mounting brackets are attached to the airbag.

2. A pelvic airbag as in claim 1 wherein the thickness of the airbag in an uninflated configuration is between about 2 to about 25 millimeters.

3. A pelvic airbag as in claim 1 wherein the thickness of the airbag in an uninflated configuration is between about 7.5 to about 25 millimeters.

4. A pelvic airbag as in claim 1 wherein the thickness of the airbag in an uninflated configuration is between about 2 to about 4 millimeters.

5. A pelvic airbag as in claim 1 wherein the airbag is made of a material that is selected from the group consisting of metal, plastic, or combinations of metal and plastic.

6. A pelvic airbag as in claim 1 wherein the airbag is constructed such that when it is in an uninflated configuration, the shape of the airbag is substantially rectangular.

7. A pelvic airbag as in claim 1 wherein the airbag is in fluid communication with an inflator housed within an inflator housing.

8. A pelvic airbag is in claim 1 wherein the airbag provides impact protection to the pelvis or leg of a vehicle occupant.

9. A pelvic airbag as in claim 1 wherein a reaction beam is attached to the inner skin and supports the pelvic airbag.

10. A pelvic airbag as in claim 9 wherein the reaction beam is bowed.

11. A pelvic airbag as in claim 9 further comprising a rubber damper that is positioned between the reaction beam and an inflator housing.

12. A pelvic airbag as in claim 1 wherein the airbag comprises one or more folds.

13. A pelvic airbag as in claim 1 wherein the attachment mechanism comprises one or more weldments.

14. A pelvic airbag as in claim 1 wherein the brackets are attached to the airbag via one or more connectors.

15. A pelvic airbag as in claim 1 wherein the airbag further comprises a shell layer that is attached to the front panel.

16. A pelvic airbag as in claim 15 wherein the shell layer is designed to fit into an aperture in the trim panel.

17. A pelvic airbag as in claim 1 wherein the trim panel is an integral layer that covers the airbag.

18. A pelvic airbag as in claim 1 wherein when the airbag is in an inflated configuration, the airbag increases the rigidity of the vehicle door.

19. A pelvic airbag as in claim 1 wherein the airbag is constructed such that when the airbag is in an inflated configuration, the airbag is capable of dissipating energy associated with a crash.

20. A pelvic airbag as in claim 1 wherein the airbag is constructed such that deploying the airbag into an inflated configuration decreases a length of the airbag.

21. A pelvic airbag as in claim 1 wherein the recess is an opening.

22. A pelvic airbag as in claim 1 wherein the size of the recess corresponds to the size of the airbag, when the airbag is in its folded, undeployed condition.

23. A pelvic airbag as in claim 1 wherein the recess is located below an armrest of the vehicle door.

24. A pelvic airbag assembly comprising:
a pelvic airbag, the airbag comprising a front panel and a rear panel attached to the front panel, wherein the airbag is constructed to be retained in a vehicle door and positioned entirely below an armrest of the vehicle door, wherein the airbag is retained in a recess of an inner skin of the vehicle door; and
an attachment mechanism for attaching the airbag within a vehicle door, wherein the attachment mechanism is attached to the airbag and comprises one or more mounting brackets that span the rear panel, wherein one or more fasteners engage the one or more mounting brackets and attach the airbag to the inner skin, wherein the one or more mounting brackets are attached to the airbag.

25. A pelvic airbag assembly as in claim 24 wherein the thickness of the airbag in an uninflated configuration is between about 2 to about 25 millimeters.

26. A pelvic airbag assembly as in claim 25 wherein the thickness of the airbag in an uninflated configuration is between about 7.5 to about 25 millimeters.

27. A pelvic airbag assembly as in claim 25 wherein the thickness of the airbag in an uninflated configuration is between about 2 to about 4 millimeters.

28. A pelvic airbag assembly as in claim 24 wherein the assembly further comprises an inflator in fluid communication with the airbag, the inflator being housed within an inflator housing that is attached to the rear panel.

29. A pelvic airbag assembly as in claim 24 further comprising a reaction beam disposed to support the pelvic airbag.

30. A pelvic airbag assembly as in claim 24 further comprising a rubber dampener.

31. A pelvic airbag assembly as in claim 24 wherein the airbag is made of a material selected from the group consisting of metal, plastic, or combinations of metal and plastic.

32. A pelvic airbag assembly as in claim 24 wherein the pelvic airbag further comprises one or more folds.

33. A pelvic airbag assembly as in claim 24 wherein the attachment mechanism comprises one or more weldments.

34. A pelvic airbag assembly as in claim 24 wherein the airbag further comprises a shell layer that is attached to the front panel.

35. A pelvic airbag assembly as in claim 24 wherein when the airbag is inflated, the airbag increases the rigidity of the vehicle door.

36. A pelvic airbag assembly as in claim 24 wherein the airbag assembly is constructed such that when the airbag is in an inflated configuration, the airbag is capable of dissipating energy associated with a crash.

37. A pelvic airbag assembly as in claim 24 wherein the assembly is constructed such that when the airbag is deployed into an inflated configuration, a length of the airbag will decrease.

38. A pelvic airbag assembly comprising:
a pelvic airbag, the airbag comprising a front panel and a rear panel attached to the front panel, the airbag being constructed to be retained in a vehicle door, wherein the airbag is retained in a recess in an inner skin of the vehicle door;
an inflator in fluid communication with the airbag, the inflator being housed within an inflator housing;
a reaction beam attached to the inner skins wherein the reaction beam is disposed to support the pelvic airbag; and
a rubber damper positioned between the reaction beam and an inflator housing, wherein one or more mounting brackets are attached to the airbag.

39. A pelvic airbag assembly as in claim 38 wherein the reaction beam is bowed such that it prevents the pelvic airbag from collapsing into a recess in the vehicle door.

40. A pelvic airbag assembly as in claim 38 wherein the thickness of the airbag in an uninflated configuration is between about 2 to about 25 millimeters.

41. A pelvic airbag assembly as in claim 38 wherein the airbag is made of a material that is selected from the group consisting of metal, plastic, or combinations of metal and plastic.

42. A pelvic airbag assembly as in claim 38 wherein the rear panel includes one or more folds.

43. A pelvic airbag assembly as in claim 38 wherein the airbag is attached to the vehicle door via an attachment mechanism.

44. A pelvic airbag assembly as in claim 43 wherein the attachment mechanism comprises one or more weldments.

45. A pelvic airbag assembly as in claim 43 wherein the attachment mechanism comprises one or more mounting brackets that span the rear panel.

46. A pelvic airbag assembly as in claim 38 wherein the airbag includes a shell layer that is attached to the front panel.

47. A pelvic airbag assembly as in claim 38 wherein the trim panel covers the airbag.

48. A pelvic airbag assembly as in claim 38 wherein the inflator housing is attached to the rear panel.

49. A pelvic airbag assembly comprising:
a vehicle door comprising an outer skin, an inner skin, and a trim panel, wherein the inner skin comprises a recess;
a pelvic airbag, the airbag comprising a front panel and a rear panel attached to the front panel, the airbag being constructed to be retained in the recess of the inner skin, wherein the size of the recess corresponds to the size of the airbag when the airbag is in its folded, undeployed condition;
a reaction beam attached to the inner skin, wherein the reaction beam is disposed to support the pelvic airbag;
a rubber damper positioned between the reaction beam and an inflator housing;
an attachment mechanism attached to the airbag and comprising one or more mounting brackets that span the rear panel, wherein one or more fasteners engage the one or more mounting brackets and attach the airbag to the inner skin; and
an inflator housed within an inflator housing, the inflator being in fluid communication with the airbag, wherein the one or more mounting brackets are attached to the airbag.

50. A pelvic airbag assembly as in claim 49 wherein the thickness of the airbag in an uninflated configuration is between about 2 to about 25 millimeters.

51. A pelvic airbag assembly as in claim 49 wherein the airbag is made of a material selected from the group consisting of metal, plastic, or combinations of metal and plastic.

52. A pelvic airbag assembly as in claim 49 wherein the reaction beam being bowed such that it prevents the pelvic airbag from collapsing into the recess in the vehicle door.

53. A pelvic airbag assembly as in claim 49 wherein the trim panel covers the airbag.

54. A pelvic airbag assembly as in claim 49 wherein the door further comprises a door core.

55. A pelvic airbag assembly as in claim 54 wherein the door core comprises one or more tear seams.

56. A pelvic airbag assembly as in claim 54 wherein the door core includes a hole.

57. A pelvic airbag assembly as in claim 49 wherein the airbag is positioned entirely below an armrest of the vehicle door.

58. A pelvic airbag assembly as in claim 49 wherein the trim panel comprises an aperture that accommodates the airbag.

59. A pelvic airbag as in claim 49 wherein the recess is an opening.

60. A pelvic airbag as in claim 49 wherein the recess is located below an armrest of the vehicle door.

* * * * *